United States Patent
Ridolfi

(10) Patent No.: US 10,508,583 B2
(45) Date of Patent: Dec. 17, 2019

(54) COMPOSITE EXHAUST ELEMENT

(71) Applicant: SCAMBIA HOLDINGS CYPRUS LIMITED, Limassol (CY)

(72) Inventor: Gabriele Ridolfi, Rotterdam (NL)

(73) Assignee: Bosal Emission Control Systems NV, Lummen (BE)

( * ) Notice: Subject to any disclaimer, the term of this patent is extended or adjusted under 35 U.S.C. 154(b) by 1132 days.

(21) Appl. No.: 13/970,657

(22) Filed: Aug. 20, 2013

(65) Prior Publication Data

US 2014/0065331 A1 Mar. 6, 2014

(30) Foreign Application Priority Data

Aug. 30, 2012 (EP) .................................... 12182438

(51) Int. Cl.
*F01N 13/14* (2010.01)
*F01N 13/16* (2010.01)
(Continued)

(52) U.S. Cl.
CPC .............. *F01N 13/14* (2013.01); *B32B 13/08* (2013.01); *F01N 13/148* (2013.01); *F01N 13/16* (2013.01); *F16L 59/147* (2013.01); *B32B 2262/02* (2013.01); *B32B 2607/00* (2013.01); *F01N 2310/02* (2013.01); *F01N 2310/04* (2013.01); *F01N 2310/14* (2013.01); *F01N 2530/20* (2013.01); *F01N 2530/26* (2013.01); *Y10T 428/13* (2015.01); *Y10T 428/24008* (2015.01); *Y10T 428/24942* (2015.01);
(Continued)

(58) Field of Classification Search
CPC ................... F01N 13/14; F01N 13/141; F01N 13/143148; F01N 2310/00; F01N 13/143; F01N 13/148; F01N 2530/20; F16L 59/029; F16L 59/07; F16L 59/143; F16L 59/147; F16L 59/148
USPC ....... 138/124, 148, 149, 147, 153; 428/34.6, 428/34.7, 36.1, 36.91; 181/222, 227, 228, 181/248, 252, 256; 285/47–50
See application file for complete search history.

(56) References Cited

U.S. PATENT DOCUMENTS 4,264,660 A 4/1981 Sibels
4,522,673 A * 6/1985 Fell .......................... B32B 5/26
112/440
(Continued)

FOREIGN PATENT DOCUMENTS

CN 101571066 A 4/2008
EP 0718539 A2 6/1996
(Continued)

OTHER PUBLICATIONS

Billings et al. Simultaneous Removal of Acid Gases, Mist, and Fumes with Mineral Wool Filters, Journal of Air Pollution Control Association, 8:3, 185-202.*
(Continued)

*Primary Examiner* — Lee E Sanderson
(74) *Attorney, Agent, or Firm* — Merchant & Gould P.C.

(57) ABSTRACT

The exhaust element comprises an outer shell made of a composite material and an inner thermal protection. The inner thermal protection comprises a layer of high temperature insulation material and an inner liner for abrasion protection of the high temperature insulation material. The inner liner is a high temperature resistant textile.

20 Claims, 2 Drawing Sheets

(51) Int. Cl.
*F16L 59/147* (2006.01)
*B32B 13/08* (2006.01)

(52) U.S. Cl.
CPC .............. *Y10T 428/24999* (2015.04); *Y10T 428/249921* (2015.04); *Y10T 442/30* (2015.04); *Y10T 442/40* (2015.04)

(56) References Cited

U.S. PATENT DOCUMENTS

| | | | | |
|---|---|---|---|---|
| 5,139,839 | A | * | 8/1992 | Lim ................ F16L 59/168 428/102 |
| 5,400,830 | A | | 3/1995 | Stiles et al. |
| 5,552,196 | A | * | 9/1996 | Haselkorn ............... F02B 77/11 138/146 |
| 5,888,641 | A | | 3/1999 | Atmur et al. |
| 5,910,095 | A | | 6/1999 | Strasser et al. |
| 5,927,070 | A | | 7/1999 | Northam et al. |
| 5,947,094 | A | | 9/1999 | Atmur et al. |
| 6,134,881 | A | | 10/2000 | Strasser et al. |
| 6,206,136 | B1 | | 3/2001 | Swindlehurst et al. |
| 6,809,050 | B1 | * | 10/2004 | McGinnis ............... C03C 13/00 501/35 |
| 2004/0003630 | A1 | * | 1/2004 | Akers ................ F16L 59/029 66/197 |
| 2004/0137175 | A1 | | 7/2004 | Dillon et al. |
| 2006/0207826 | A1 | | 9/2006 | Williams |
| 2006/0218906 | A1 | | 10/2006 | Ruggiero |
| 2006/0251201 | A1 | * | 11/2006 | Singh ..................... G21F 5/10 376/272 |
| 2007/0151798 | A1 | * | 7/2007 | Smith ..................... F01N 1/04 181/256 |
| 2007/0240932 | A1 | | 10/2007 | Van De Flier et al. |
| 2009/0183502 | A1 | | 7/2009 | Leroy |
| 2009/0241528 | A1 | | 10/2009 | Leroy |

FOREIGN PATENT DOCUMENTS

| | | | |
|---|---|---|---|
| FR | 1449510 | | 10/1965 |
| GB | 1129287 A | | 10/1968 |
| GB | 1333336 | | 10/1973 |
| JP | H0989357 A | | 4/1997 |
| KR | 2002/0083881 A | | 11/2002 |
| WO | 2005091902 A2 | | 10/2005 |
| WO | 2009080948 A2 | | 7/2009 |
| WO | 2012064194 A1 | | 5/2012 |
| WO | WO 2012064194 A1 | * | 5/2012 ........... F01N 13/148 |

OTHER PUBLICATIONS

Fabrication Specialties website as archived online at https://web.archive.org/web/20081202045157/http://www.fabricationspecialties.com/pdf/prodInsulTechMat.pdf on Dec. 2, 2008.*

European Search Report for EP Application No. 12182438 dated Feb. 13, 2013 (6 pages).

* cited by examiner

COMPOSITE EXHAUST ELEMENT

CROSS-REFERENCE TO RELATED APPLICATION

This application claims the priority benefit of European Patent Application No. EPC12182438.7, filed on Aug. 30, 2012, which is hereby incorporated herein by reference.

TECHNICAL FIELD

The present invention relates to a composite exhaust element, especially a composite exhaust element for use in an exhaust system of a motor vehicle.

BACKGROUND

Fuel efficiency in cars has become a critical issue particularly due to increase in environmental concerns, stricter legislation and rise in oil prices. One way to enhance efficiency is to reduce fuel consumption. This may be achieved by reducing car component weight.

One way to reduce weight is to replace metal parts of the exhaust system of a car by lightweight composite materials, such as fiber reinforced resin composites. However, composite materials are often not stable up to high temperatures. Since exhaust gases may reach temperatures of 800 to 1000 degrees Celsius, these composite materials need thermal protection.

In U.S. Pat. No. 5,400,830 it is suggested to construct an automotive exhaust pipe by providing a thermal insulation layer inside an outer tube made of a composite material. The tube is provided by a thin-walled metallic inner liner to protect said insulation layer from abrasion by exhaust gases guided inside the pipe. However, metallic tubes still add to the total weight and have low performance in sound absorption.

In order to further reduce weight of the exhaust system, it is suggested to replace the metallic inner tube by a metallic mesh. A metallic mesh holds in place the insulation layer and improves the acoustic properties of the pipe. Often, an insulation layer is a high temperature wool or fiber mat, which fibers are prone to be eroded by the exhaust gas through the openings in the metallic mesh. An eroded insulation has lower thermal insulation properties and may lead to the rupture or the melting of the outer composite tube. Long term stability of such an exhaust pipe is not given.

There is a need for lightweight exhaust elements that have good acoustic performance. Especially, there is a need for exhaust elements, wherein metal parts are replaced by composite materials and that provide equal or better acoustic performance.

SUMMARY

According to the invention there is provided a composite exhaust element comprising an outer shell made of a composite material and an inner thermal protection. The inner thermal protection comprises a layer of high temperature insulation material and an inner liner for abrasion protection of the high temperature insulation material. The inner liner is a high temperature resistant textile.

The composite material of the outer shell is thermally protected by the inner thermal protection. The inner thermal protection on its inner side withstands the hot temperatures of the exhaust gas flowing inside the exhaust element, which temperature may be as high as 1000 degrees Celsius, i.e. the thermal protection has a resistance temperature to withstand these temperatures. On its outer side the temperatures are brought down by the inner thermal protection to a temperature the composite material of the outer shell may withstand. Such an outer temperature may be as low as 200 to 250 degrees Celsius.

The inner thermal protection comprises a layer of high temperature insulation material. In order to protect this layer of high temperature insulation material from abrasion through exhaust gases guided through the exhaust element, an inner liner made of a high temperature resistant textile is arranged adjacent to the inner side of the layer of high temperature insulation material.

Abrasion or erosion of the high temperature insulation material is caused by mechanical or chemical impact of the often noxious or oxidizing atmosphere in an exhaust system. Through the textile inner liner a direct contact of exhaust gas with the high temperature insulation material may be prevented or kept at a minimum.

In addition, sound properties of a textile inner liner are equal or even enhanced compared to inner metal mesh liners. However, the latter are prone to corrosion and do not provide much abrasion protection for the layer of high temperature insulation material.

In a textile, fibers are bound in a network, for example yarn or thread that forms the textile. The individual fibers are less prone to abrasion by a passing by gas flow compared to raw fibers of for example a non-woven or wool layer of a high temperature insulation material. Surprisingly, the textile inner liner is not eroded by a gas flow. Next to the fibers that are bound in a network, another reason may be the reduced surface roughness of the textile inner liner that seems not to provide a target for abrasive processes.

Textiles may be manufactured in various densities and may provide various surface roughnesses. Therefore, they provide a wide field of abrasion protection including flexibility in the sound absorption and especially sound transparency property of the inner liner. With a surface roughness also the back pressure in the exhaust element may be influenced, keeping the back pressure low with a small surface roughness.

With the composite exhaust element according to the invention, the sound absorption capability of an exhaust system may be ameliorated such as to be in conformity with legally required loudness limits. By this, even mufflers may become obsolete or may be reduced in size. Due to the higher thermal insulation of the composite exhaust element according to the invention compared to metal exhaust parts, also heat shields generally arranged between exhaust system and underbody of a motor vehicle may be omitted or reduced. By both of these properties of the composite element according to the invention, the weight of an exhaust system may remarkably be reduced. In general, commercial mufflers weigh more than half the total weight of an exhaust system.

"High temperature insulation material" as used in the context of this application, can withstand temperatures or has a resistance temperature, respectively, above 300 degrees Celsius, preferably above 600 degrees Celsius, for example resistance temperatures up to 1200 degrees Celsius. Since high temperature insulation material may be arranged in layers, materials having different resistance temperatures for different layers. For example, a layer more distanced from an exhaust gas flow may be chosen among high temperature insulation materials ranging from resistance temperatures between 400 degrees Celsius to 700 degrees Celsius, while a high temperature insulation material being arranged next to the textile inner liner preferably has a resistance temperature above 800 degrees Celsius, more preferably above 1000 degrees Celsius.

Materials having a lower resistance temperature are generally less expensive than materials with higher resistance temperatures. Therefore, the selection of appropriate materials may contribute to the total costs of the exhaust system.

High temperature insulation material is preferably chosen among fibrous materials, such as high temperature insulation wool. However, also non-fibrous insulation material requires protection against abrasion, for example, brittle materials such as ceramic materials.

"High temperature resistant textile materials" as used in the context of this application preferably withstand temperatures above 600° C., more preferably above 800° C. or above 1000° C. The materials for the high temperature resistant textile material and thus for the inner liner withstand the temperature of the exhaust gas flowing inside the exhaust element. Depending on the location in the exhaust system where the exhaust element according to the invention is arranged, the materials may be chosen accordingly. Temperatures closer to the outlet of an engine or close to the catalytic converter are higher than temperatures closer to a silencer, which is basically arranged close to the outlet of the exhaust system.

Examples of high temperature resistant fibers preferably used for the high temperature insulation material and the high temperature resistant textile are: glass fibers (E-Glass, S-glass), silica fibers, alumina fibers, alumina-silica fibers, quartz fibers. All of these fibers also have a low thermal conductivity.

Examples of composite materials for the outer shell are alumina-silicate resins, fiber reinforced ceramic matrix composites or phenolic resins. Some of these raisins are very cost efficient and easy to handle, but may have resistance temperature as low as 200 to 250 degree Celsius. The outer shell is manufactured, for example by pultrusion or molding as is known in the art and which will therefore not be further described.

Textiles provide the further advantage of being flexible such as to neatly cover also non-flat or non-even surfaces and may easily be tailored to various forms and dimensions. A textile for the inner liner may also be chosen or treated according to its position in an exhaust system, such as for example bends in an exhaust element, for example an exhaust pipe. In the proximity of bends, the textile may, for example, have a more dense structure, be thicker or may be coated.

For stabilization or fixation purposes, a metal mesh may be provided inside the inner liner. Such a metal mesh may be incorporated into the inner liner or may be provided as separate metal mesh liner arranged next to and more centrally than the textile inner liner.

According to an aspect of the composite exhaust element according to the invention, the high temperature resistant textile is a woven, knitted or braided high temperature resistant textile. Weaving, knitting and braiding are well known methods of creating a textile. They allow for a variety of textiles manufactured with different kinds of materials. Especially, density and surface texture may be varied. For example, different manufacturing styles may also be mixed or chosen in order to make the textile thicker or more dense in certain areas or for certain applications of the exhaust element.

In some preferred embodiments the inner liner of the exhaust element according to the invention is a fabric or cloth. A cloth is a single layer of a flexible woven textile made of a network of fibers such as thread or yarn, and is simple in manufacturing and handling. Also a fabric generally is a single layer of a flexible woven material made of a network of fibers. However, a fabric may also be made by different manufacturing methods, for example according to the methods as mentioned above, and allows the manufacture of multi-layers or thick layers, even when using thin threads or yarn.

According to another aspect of the composite exhaust element according to the invention, the inner liner has the form of a sleeve.

Large parts of an exhaust system are in the form of tubes. Therefore, in a preferred embodiment of the invention, the exhaust element is a pipe. Outer shell, layer of high temperature insulation material and inner liner have the form of tubes. The inner liner may directly be manufactured in the form of a sleeve, thereby providing homogeneous properties (surface texture, density) along the whole circumference and length of the sleeve. However, a textile may also be brought into the form of a sleeve, for example by stitching or bonding.

The exhaust element according to the invention may for example also be a muffler or silencer or part of a muffler or silencer. It may adopt the functions of a heat shield or replace or complete parts of an exhaust system or installation, where insulation comprising abrasion protection combined with sound absorption or other specific acoustic properties is required or might improve performance or efficiency of the exhaust system or installation.

According to a further aspect of the composite exhaust element according to the invention, the inner thermal protection further comprises an outer liner being a high temperature resistant textile. The layer of high temperature insulation material is arranged between the outer liner and the inner liner. In this arrangement the layer of high temperature insulation material is sandwiched between two high temperature resistant textile liners. The layer of high temperature insulation material is kept within the two liners, which is favorable, especially if the material is highly fibrous or otherwise prone to decomposition.

Outer liner, layer of high temperature insulation material and inner liner may all or only two of them be fixed to each other, for example by sewing with a high temperature resistant thread, by gluing, bonding, clamping or another fixation method. A fixing of at least two layers together facilitates a handling of the so fixed together elements. In addition, layers fixed together minimize the risk of being mutually dislocated. The arrangement outer layer, high temperature insulation material and inner liner may be held together, for example by a through-stitching with a high temperature resistant thread. A through-stitching is especially favourable if the layer of high temperature insulation material is a layer of high temperature insulation wool, i.e. a layer of essentially a more or less loose agglomeration of fibers. Thus, the arrangement is an individual component, which may form the inner thermal protection.

According to an aspect of the composite exhaust element according to the invention, the inner thermal protection is fixed to the outer shell by gluing or mechanical attachment, such as for example hooks, velcro-type attachments, push buttons, snap fastener or the like.

Gluing, bonding or direct mechanical attachments are favourable methods by which the inner thermal protection may directly be attached to the outer shell. Preferably, no separate fixation for individual layers or liners are required and no separate fixation, such as for example clamps or metal meshes for the inner thermal protection is required. By a direct mechanical attachment, the inner thermal protection, especially the layer of high temperature insulation material may be kept in place inside the outer shell. These attachment methods are especially favourable, if the inner thermal protection is manufactured as one single component, for example as described above. However, the direct attachment method is also favorable, if not all layers are fixed together. For example at least one layer may be fixed to another layer, such as a high temperature insulation material to an outer liner.

According to some preferred embodiments of the above described inner thermal protection for example formed as an individual component, the outer liner is a textile fabric having an outer resistance temperature and the inner liner is a textile fabric having an inner resistance temperature. The outer resistance temperature is lower than the inner resistance temperature. The layer of high temperature insulation material arranged between the inner and outer liner may for example be a silicate wool layer, for example an alkaline-earth silicate glass wool layer.

While physical and chemical requirements have to be met, the manufacture of the inner thermal protection also has to be cost efficient. This may be achieved by choosing appropriate materials for the different parts (layer, liner) of the inner thermal protection. In an exemplary arrangement, the inner liner is a more expensive but more temperature resistant textile fabric, for example a silica or S-glass textile fabric, and the outer liner is a less expensive but also less thermal resistant textile fabric, for example an E-glass fabric. Silicate wool layers for example have resistance temperatures up to 1000, 1300 or 1500 degrees Celsius and are less costly as for example polycrystalline wools.

According to another aspect of the composite exhaust element according to the invention, the inner liner is coated with a high temperature resistant coating such as for example silica based coating.

With a high temperature resistant coating, erosion resistance of the inner liner may further be enhanced and abrasion may thus further be reduced. In addition, the already small roughness of the textile inner liner may further be reduced, thereby reducing back pressure in the exhaust system. Coatings may also be used to make an inner liner gas-tight. In order not to negatively influence the acoustic properties of the inner liner, a coating is preferably applied in a thin layer only and a gas-tight coating is preferably applied in sensitive areas only, for example in the proximity of bends of an exhaust system. A coating applied in parts of the exhaust element may also be used to specifically influence damping or reflection of certain sound frequencies. Portions of the inner liner, which are acoustically closed may for example be portions provided with a thin metal foil. Acoustically closed materials may for example be added to the inner liner or may replace a portion of the inner liner. By this, an exhaust element with acoustically different inner liner portions arranged along the length or circumference of the exhaust element may be provided.

According to yet another aspect of the composite exhaust element according to the invention, the composite material of the outer shell is a fiber reinforced composite material. For stabilizing purposes a composite material, such as a resin, may be reinforced by the addition of fibers. Examples of such fibers are carbon fibers, boron fibers, silica fibers, glass fibers etc. Fiber reinforced composite materials used in exhaust systems are known in the art, for example from US 2009/0183502 or US 2007/0240932. In preferred embodiments of the exhaust element according to the invention, glass fibers, such as E-glass fibers, in alumina-silicate resin or phenolic resin are used as composite material for the outer shell.

According to another aspect of the composite exhaust element according to the invention, the high temperature insulation material is a high temperature insulation wool. High temperature insulation wools are a non-woven loose arrangement of high temperature resistant fibers and have proven to be very good insulating materials. In general, these wools come in the form of mats that may be manufactured by needling of a layer of fibers. Some products also have small amounts of binder or hardener added to the fibers or to the surface of the layer of fibers, or by a combination of these measures to better keep the fibers together. Binders or hardeners are often not as temperature resistant as the fibers and may negatively influence sound absorption capability of the wool. Therefore, as insulation wool—or in general in high temperature insulation material being made of or essentially containing fibers—the pure fibers without any binder are used. Some high temperature insulation material containing fibers contain binder that burn off at temperatures around 200 degrees Celsius. These binders allow for a better handling of the basic material but are eliminated after installation of the exhaust element and do therefore not further influence sound absorption capability of the exhaust element. High temperature insulation wools may be made for example from mineral fibers, alkaline earth silicate fibers, refractory ceramic fibers or polycrystalline fibers. These fibers mainly differ with respect to their resistance temperature and cost.

In some preferred embodiments the high temperature insulation wool is one or a combination of alkaline earth silicate wool, polycrystalline fiber wool or aluminum silicate fiber wool. These are examples of commercially available wools with resistance temperature above 600 degrees Celsius and up to 1200 or 1600 degrees Celsius.

According to a further aspect of the composite exhaust element according to the invention, the inner liner, the high temperature insulation material or an outer liner where applicable, comprises fibers of one or of a combination of the group of silica, aluminum, aluminum-silicate, glass and quartz. Such fibers support the high thermal insulation property of the inner thermal protection due to the low thermal conductivity of the fibers. While also other fibers, for example carbon or boron fibers, are suitable for high temperature applications, these fibers have a higher thermal conductivity thus lowering the thermal insulation property of the insulation material. However, also these fibers are insulating fibers with a lower thermal conductivity than conventional metals as used in exhaust applications.

According to another aspect of the composite exhaust element according to the invention, the inner thermal protection comprises a further layer of high temperature insulation material. The further layer is arranged on an opposite side of the layer of high temperature insulation material than the inner liner, and may comprise a cellular insulation material.

The inner thermal protection may comprise more than one layer of high temperature insulation material. The materials of the individual layers may be chosen for a technical-economic optimisation of the inner thermal protection. An innermost layer of high temperature insulation material has to withstand temperatures as high as temperatures flowing inside the exhaust element. Any further layer of high temperature insulation material surrounding the innermost layer or—more general—being arranged in a more circumferential region has to withstand temperatures only as high as the temperature at the location on an outside of its neighbouring and more centrally arranged layer of high temperature insulation material. Thermal insulation at high temperatures is also often correlated with layer thickness. Space is also an optimization parameter, since space especially for exhaust systems is at least in some locations rather limited. Therefore, it may be favorable to bring down initial high temperatures to a moderate level and then arrange a further layer of high temperature insulation material having a lower resistance temperature. By this, for example a more expensive and possibly space consuming insulation layer may be kept small and may be complemented for example by a less costly, more compact layer, which may possibly be not as temperature resistant as the more inwardly arranged layer. For example, the layer of high temperature insulation material may have a resistance temperature of 1000 to 1400 degrees Celsius and is in preferred embodiments a layer solely made of high temperature resistant fibers (with the exception of small amounts of binder or hardeners). A further layer may have a temperature resistance of for example 400 to 700 degree Celsius, which further opens up the field also for non-fibrous materials.

An example of suitable non-fibrous high temperature insulation material is cellular insulation material. This is a closed or open cell material that may be foamed or sprayed into place. Examples of cellular insulating materials are polyurethane cellular glass, cellular silica and silica aerogels. Cellular insulating materials also often come in the form of extended flexible or rigid boards or mats.

A further layer may also provide different material properties as the layer of high temperature insulation material, such as more or less stiffness or flexibility. In addition, the further layer may provide mechanical or chemical properties that are well suited in combination with even further layers or with the composite material of the outer shell. For example, they may allow a secure attachment of the outer layer to the composite outer shell, for example by application of an adhesive.

According to another aspect of the composite exhaust element according to the invention, the inner thermal protection comprises a blank layer forming an empty cavity. "Empty" is herewith understood as being filled with gas or gases and not with an insulating or any other solid or liquid material. In addition, the cavity is acoustically accessible, which means that acoustic waves may enter the blank layer or cavity. Preferably, the cavity is acoustically connected to an inner duct of the exhaust element, through which the exhaust gas flows. Preferably, the inner liner as well as the high temperature insulation material, or any further layer of the thermal insulation arranged inside of the cavity, respectively, are acoustically open such that acoustic waves may pass from the inner duct through these layers and into the cavity.

The blank layer is arranged on an opposite side of the layer of high temperature insulation material than the inner liner. Thus a volume otherwise filled with a high temperature insulation material—in one or several layers—, is now partly formed preferably by an air gap. Since the temperature of gases influences the density of the gas and the speed of sound, an empty cavity has a better sound attenuation performance when filled with a cooler gas than when filled with a hotter gas. Therefore, the blank layer is preferably arranged between composite outer shell and high temperature insulation material, where the temperatures are lowest inside the exhaust element ('cool' side of insulation layer). In an initial state of the exhaust element, the air gap is filled with air. In use, air may slowly be replaced by gas flowing through the exhaust element. Due to an acoustically open structure of the inner thermal protection, acoustical connection exists between the cavity and an inner duct where typically hot exhaust gas flows. Preferably, all layers of the inner thermal protection are acoustically open. However, also an acoustic passage may be provided through preferably all layers of the inner thermal protection to establish an acoustic connection between the inner duct and the cavity. However, a gas flow into and through the cavity is limited such that only low heat exchange from an inner duct to the cavity occurs. Thus a better acoustical performance is achieved by a lower speed of sound and a higher gas density in the cavity. Preferably, a blank layer or cavity does not extend over a same distance as the insulating material layers. In preferred embodiments a cavity extends over part of the length of a composite exhaust element and the insulating layers extend over the entire length of the composite exhaust element.

In preferred embodiments, an outer liner is provided between blank layer and high temperature insulation material. An outer liner fixates the insulation material and prevents it from spreading into the empty cavity, especially if a fibrous material is chosen. In addition, the textile nature of the outer liner allows sound to enter into the empty cavity, so that the cavity adds to the sound attenuation of the exhaust element. Especially in applications or locations where the composite element according to the invention represents a muffler with a certain volume, it may be advantageous to fill part of the complete volume with an empty cavity or air gap. By this, also weight may be saved.

With the provision of an empty layer arranged on the 'cool' side of the layer of high temperature insulation material, also a volume of a muffler may further be reduced—and hence cost and weight may be reduced: A muffler comprising an empty layer arranged on the 'cool' side of the layer of high temperature insulation material may have a sound attenuation performance equivalent to conventional exhaust systems even with reduced dimensions. Conventional mufflers are not provided with a layer of high temperature insulation material but are entirely filled with relatively hotter gas compared to the gas in the empty layer according to the invention, thus the hotter gas having lower sound performance.

In embodiments comprising a blank layer, a supporting metal braid or mesh may be provided to support at least one of the inner liner and the outer liner.

In some preferred applications, the composite exhaust element according to the invention is a part of an exhaust system for motor vehicles. The exhaust element according to the invention is especially suited as alternative for metal elements for example tubes, in conventional metal exhaust systems of cars. Given the light-weight composite exhaust elements a significant weight reduction may be achieved. Given the acoustic absorption properties, heavy parts of an exhaust system, such as mufflers or silencers, may even be omitted or build as lighter constructions. This further reduces the overall weight of the exhaust system and may contribute to fuel reduction used in the respective motor vehicle.

BRIEF DESCRIPTION OF FIGURES

The invention is further described with reference to exemplary embodiments of the exhaust system as shown in the following drawings. Wherein

FIG. 1 shows an arrangement of a composite exhaust element with an outer shell 1 and an inner thermal protection 2. The outer shell 1 is made of a composite material, for example a fiber reinforced resin. The inner thermal protection 2 comprises a first and a second layer of high temperature insulation material 21, 22 and an inner liner 20 made of a high temperature resistant textile.

Figure 1:
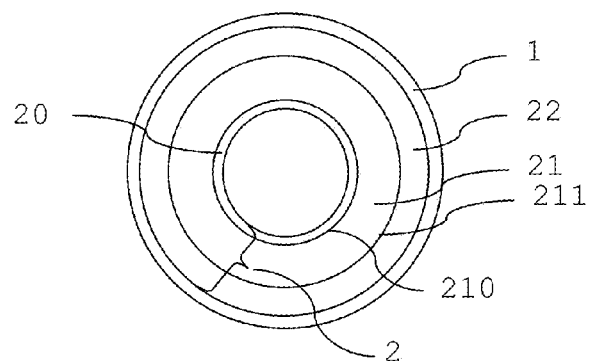
FIG. 1 is a configuration of a composite exhaust element.

The more centrally arranged first layer 21 of high temperature insulation material is arranged adjacent to the inner liner 20 and is made of a high temperature material suited to withstand the temperatures of the hot gas flowing through the exhaust element and through the inner liner 20. Preferably, such a material withstands temperatures of up to 1000 degrees Celsius and is a high temperature insulation wool, for example a silicate fiber wool.

The second layer 22 of high temperature insulation material surrounding the first layer 21 is made of a high temperature material that withstands the temperatures on the outer circumference 211 of the first layer 21. Since these temperatures are generally already reduced compared to the temperatures on the inner circumference 210 of the first layer 21, the high temperature material of the second layer may preferably withstand temperatures only below 700 degrees Celsius. A second layer 22 may be omitted if the first layer 21 provides a sufficient thermal insulation or may also be substituted by a blank layer forming an air gap.

The innermost part of the inner thermal protection 2 directly in contact with hot gas flowing through the exhaust element is formed by the inner liner 20. This inner liner 20 is made of a high temperature resistant textile. Preferably, the textile is a woven, knitted or braided textile. It may be a fabric or cloth made of fibers of high temperature resistant material, which fibers may essentially be of the same material as used for the high temperature insulation material.

Preferably, the inner liner 20 is prefabricated in the form of a sleeve with a predefined diameter. The sleeve may directly be braided or woven from high temperature resistant fibers. An example of an embodiment of a braided sleeve is the alumina-silica an alumina-silica fiber sleeve from Hiltex Technische Weefsels BV, West Knollendam, The Netherlands, or the fiber sleeve 3M™ Nextel™ braided sleeving supplied by 3M, St. Paul, Minn., USA.

The inner thermal protection 2 may be kept in position inside the outer shell by appropriate fixation means. These may for example be an inner metal mesh as previously used as inner metal liner or clamps provided at ends of an exhaust element.

Figure 2:
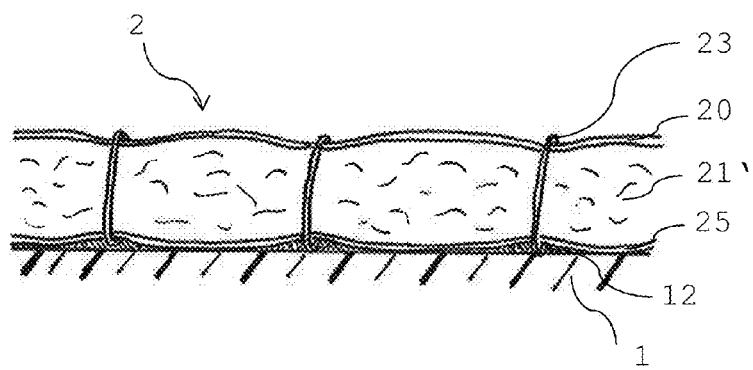
FIG. 2 shows an inner thermal protection in sandwich form.

In FIG. 2 an inner thermal protection 2 is shown that may be prefabricated as an individual component. With such an individual component an inner metal mesh liner or other separate fixation tools may possibly omitted. The component is attached to the outer shell 1, for example with a layer of glue 12 or another adhesive layer. The component may also be mechanically attached to the outer shell 1, for example by press buttons or velcro-type attachments. By this, the inner thermal protection 2 is kept in position.

The inner thermal protection 2 comprises a layer of high temperature insulation wool 21' sandwiched between an inner liner 20 and an outer liner 25, each made of a high temperature resistant fabric. The outer liner 25 is arranged on the side of the layer of high temperature insulation wool 21' opposite the inner liner 20 and opposite the initial high temperatures. Therefore, the outer liner 25 may be made of a material that is more cost efficient and not as temperature resistant as the inner liner 20. While the inner liner 20 preferably is made of a silica or S-glass fabric, the outer liner 25 may be an E-glass fabric. Preferably, also outer liner 25 is prefabricated in the form of a sleeve. The inner liner 20, layer of insulation wool 21' and outer liner 25 are through-stitched with a high temperature thread 23, for example a pure silica thread. By this stitching a grid pattern may be formed holding together the inner thermal protection 2.

Similar blankets were used as insulation for the NASA Space Shuttle, also known as Advanced Flexible Reusable Surface Insulation (AFRSI). Therein, silica felt is sandwiched between silica or S-glass fabric and the outer surface is densely coated with a silica coating to improve erosion resistance. Such a thick coating suppresses sound absorption or at least negatively influences sound absorption properties. However, acoustic properties are no issue with the Space Shuttle isolation system and accordingly sound absorption or sound performance in general is no issue with these blankets.

Figure 3:
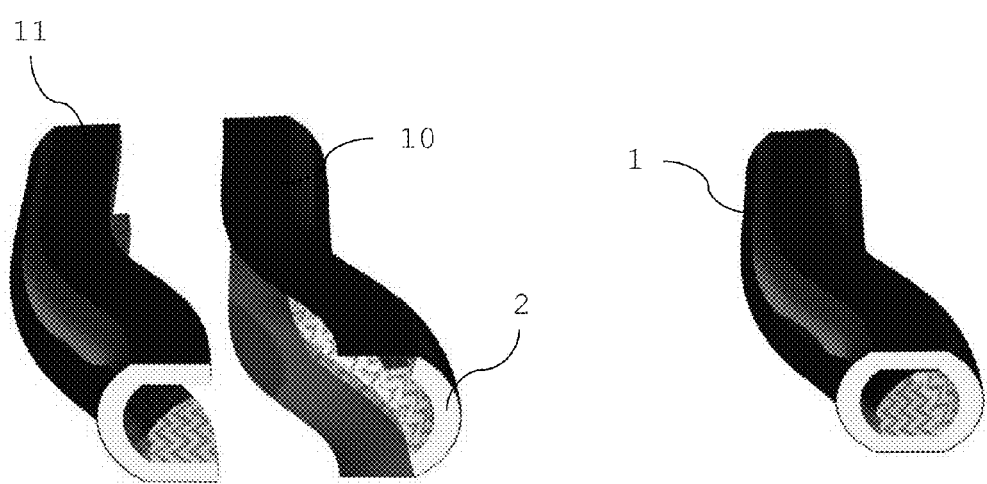
FIG. 3 depicts a mounting of a composite exhaust element.

FIG. 3 shows a special form and mounting method of a composite exhaust element with an outer shell 1 having a flat top and flat bottom and round sides. The composite outer shell 1 is manufactured, for example molded as a whole tube and is cut into two half shells 10, 11 as shown on the left hand side of FIG. 3. The two half shells 10, 11 are then provided with the inner thermal protection 2, for example an inner thermal protection 2 as described in FIG. 2. The two half shells are then joined to form the exhaust element 1 as shown on the right hand side of FIG. 3. Joining may be made for example by clamping, screwing, bonding, welding or other joining techniques as known in the art. The two half shells 10, 11 may also be manufactured separately.

Providing two half shells allows for a very precise alignment of the inner thermal protection 2 before the two half shells are rejoined. The specific form with flat bottom and top provides an easy handling of the whole and the separated composite outer shell 1. It also allows for an automated manufacturing of the outer shell 1, for example using braided fiber reinforcement.

Figure 4:
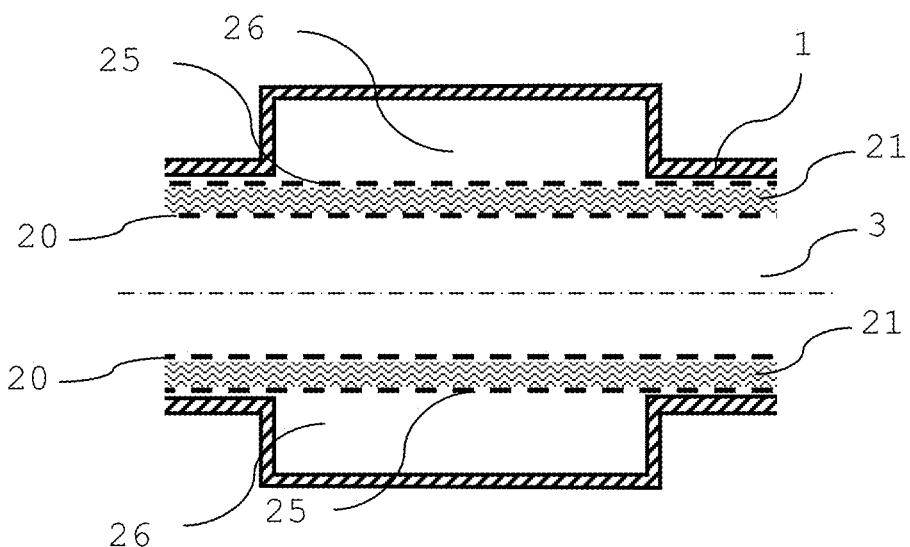
FIG. 4 shows an exhaust element with a cavity.

FIG. 4 shows an embodiment of a composite exhaust element with a cavity 26 arranged between outer liner 25 and outer shell 1 of the composite exhaust element. The cavity 26 is formed as a portion of the outer shell 1 having an enlarged diameter. An inner liner 20, a high temperature insulation material 21 and an outer liner 25 are arranged along and within the outer shell 1. Due to the enlarged diameter an empty cavity is formed between outer liner 25 and outer shell 1 in the region with the enlarged diameter. Hot exhaust gas flowing in the inner duct 3 may not or only in a very limited manner pass through the thermal insulation layers 20,21,25 made of insulating material. In combination with the high thermal insulation properties of these layers 20,21,25, no or only limited heat exchange takes place through these layers. Thus, the cavity 26 remains cool and performs better sound performance as for example known perforated pipe resonators. Since inner liner 20, preferably made of a high temperature resistant textile sleeve, high temperature insulation material 21 and an outer liner 2, preferably also made of a high temperature resistant textile sleeve are all acoustically transparent, acoustical waves may enter the cavity 26.

Figure 5:
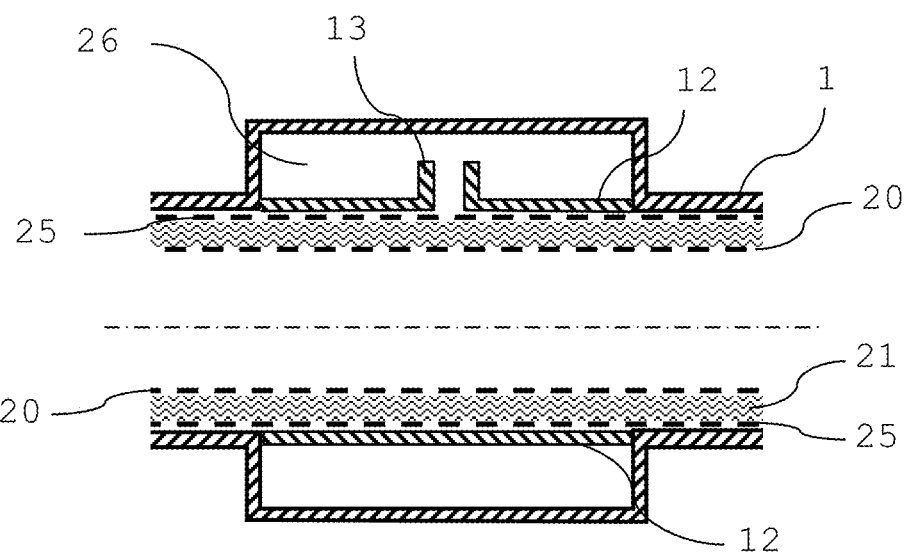
FIG. 5 shows another embodiment of an exhaust element with a cavity.

In a variation, as shown in FIG. 5, the access to the cavity is limited to form a so-called Helmholtz neck 13. The cavity is closed by an additional, acoustically closed, wall 12 except for a neck 13 extending into the cavity 26. The neck may have the form of a tube of a circular or any other cross section and extends radially outwardly. In variations, the neck may for example also be positioned under an angle or contain a bend such as to generate an acoustical duct that together with the cavity forms a Helmholtz resonator. An outer liner 25 is provided, which preferably at least covers the entry to the neck 13. Since the additional wall 12 and neck 13 are insulated by the other insulating layers 20,21 and possibly also 25, the same material as for the outer shell 1 may be used. Wall 12 and neck 13 may for example also be made of a plastic material. Since load is carried by the composite outer shell 1, the elements 12,13 carry no load and may accordingly be made of a weaker and more cost efficient material.

The neck 13 may also extend all the way through the insulating layers 20,21,25 such that acoustic waves from an exhaust gas in inner duct 3 may directly enter neck 13 and lead them into the cavity 26. However, since in such an embodiment the one end of the neck is in contact with hot gas, possibly other exhaust gas resistant materials (for example resistant to high temperature, abrasion etc.) for the neck than for the outer shell 1 and additional wall 12 have to be used.

Also in the embodiments of the exhaust element comprising a cavity, one or several layers may be fixed to each other and the outer liner, possibly fixed to other layers of the inner thermal protection, may be directly attached to the outer shell 1 and the wall 12, respectively.

The invention claimed is:

1. Composite exhaust tube comprising:
 a load carrying outer shell made of a fiber-reinforced composite material; and
 an inner thermal protection comprising a layer of silica-based fibrous high temperature insulation material and an inner liner for abrasion protection of the high temperature insulation material, wherein the inner liner is a high temperature resistant textile arranged to directly contact an exhaust gas flowing through the composite exhaust tube, wherein the inner thermal protection further comprises an outer liner being a high temperature resistant textile made of silica-based fibrous high temperature insulation material, the layer of high temperature insulation material being arranged between the outer liner and the inner liner, wherein the outer liner, the layer of high temperature insulation material and the inner liner are fixed to each other by sewing with a high temperature resistant thread made of silica-based fibrous high temperature insulation material.

2. Composite exhaust tube according to claim 1, wherein the high temperature resistant textile of the inner liner and the outer liner is a woven, knitted or braided high temperature resistant textile.

3. Composite exhaust tube according to claim 1, wherein the inner liner is a fabric or cloth.

4. Composite exhaust tube according to claim 1, wherein the inner liner has the form of a sleeve.

5. Composite exhaust tube according to claim 1, wherein the outer liner is a textile fabric having an outer resistance temperature, the inner liner is a textile fabric having an inner resistance temperature, the outer resistance temperature being lower that the inner resistance temperature.

6. Composite exhaust tube according to claim 1, wherein the inner thermal protection is fixed to the outer shell by gluing or mechanical attachment.

7. Composite exhaust tube according to claim 1, wherein the inner liner is coated with a high temperature resistant silica-based coating.

8. Composite exhaust tube according to claim 1, wherein the high temperature insulation material of the layer of high temperature insulation material is a high temperature insulation wool.

9. Composite exhaust tube according to claim 1, wherein the inner liner comprises fibers of silica, aluminum-silicate, glass, quartz, or a combination thereof.

10. Composite exhaust tube according to claim 1, wherein the inner thermal protection comprises a further layer of high temperature insulation material, the further layer being arranged on an opposite side of the layer of high temperature insulation material than the inner liner, and the further layer comprising a cellular insulation material.

11. Composite exhaust tube according to claim 1, wherein the inner thermal protection comprises a blank layer forming an empty cavity, the blank layer being arranged on an opposite side of the layer of high temperature insulation material than the inner liner.

12. Composite exhaust tube according to claim 11, wherein the blank layer is acoustically open.

13. Composite exhaust tube according to claim 1, wherein the exhaust tube is part of an exhaust system for motor vehicles.

14. Composite exhaust tube of claim 1, wherein the sewing with the high temperature resistant thread forms a grid pattern.

15. Composite exhaust tube according to claim 1, wherein in the outer liner, fibers having low thermal conductivity are bound in a network in the high temperature resistant textile of the outer liner.

16. Composite exhaust tube according to claim 1, wherein the inner liner is a high temperature resistant textile wherein fibers are bound in a network.

17. Composite exhaust tube according to claim 1, wherein the inner liner is made of silica-based fibrous high temperature insulation material.

18. Composite exhaust tube according to claim 1, wherein the inner liner is a high temperature resistant textile comprising fibers having low thermal conductivity bound in a network in the high temperature resistant textile of the inner liner.

19. Composite exhaust tube comprising:
 a load carrying outer shell made of a fiber reinforced composite material; and
 an inner thermal protection comprising a layer of silica-based fibrous high temperature insulation material and an inner liner for abrasion protection of the high temperature insulation material, wherein the inner liner is a high temperature resistant textile arranged to directly contact an exhaust gas flowing through the composite exhaust tube, wherein the inner thermal protection further comprises an outer liner being a high temperature resistant textile made of silica-based fibrous high temperature insulation material, wherein the layer of high temperature insulation material is arranged between the outer liner and the inner liner, wherein the inner thermal protection comprises a blank layer forming an empty cavity, wherein the blank layer is arranged on an opposite side of the layer of high temperature insulation material than the inner liner, and wherein the outer liner, the layer of high temperature insulation material and the inner liner are fixed to each other by sewing with a high temperature resistant thread made of silica-based fibrous high temperature insulation material.

20. Composite exhaust tube according to claim 19, wherein the fiber-reinforced composite material is a resin.

* * * * *